(12) United States Patent
Griffin, Jr. et al.

(10) Patent No.: US 8,054,042 B2
(45) Date of Patent: Nov. 8, 2011

(54) MODULAR POWER SUPPLY

(75) Inventors: Paul P. Griffin, Jr., Nashville, TN (US);
Mark David Rowan, Franklin, TN (US);
David Arnold Owens, Nashville, TN (US)

(73) Assignee: Griffin Technology, Inc., Nashville, TN (US)

( * ) Notice: Subject to any disclaimer, the term of this patent is extended or adjusted under 35 U.S.C. 154(b) by 553 days.

(21) Appl. No.: 12/189,292

(22) Filed: Aug. 11, 2008

(65) Prior Publication Data

US 2010/0033127 A1    Feb. 11, 2010

(51) Int. Cl.
*H02J 7/00*     (2006.01)
*H04B 1/04*     (2006.01)
*H04M 5/00*     (2006.01)

(52) U.S. Cl. ........ 320/115; 320/114; 320/107; 320/137; 455/74; 455/113; 455/556.2; 455/573; 379/322; 379/88.11; 379/332

(58) Field of Classification Search .................... 320/115
See application file for complete search history.

(56) References Cited

U.S. PATENT DOCUMENTS

| | | | | |
|---|---|---|---|---|
| 6,154,010 A * | 11/2000 | Geiger | .......................... | 320/137 |
| 6,864,798 B2 * | 3/2005 | Janik | ........................ | 340/693.11 |
| 7,076,270 B2 * | 7/2006 | Jaggers et al. | ............. | 455/556.1 |
| 2005/0168189 A1 * | 8/2005 | Schweigert | .................... | 320/107 |
| 2007/0260798 A1 * | 11/2007 | Griffin, Jr. | ..................... | 710/303 |

\* cited by examiner

*Primary Examiner* — Edward Tso
*Assistant Examiner* — Yalkew Fantu
(74) *Attorney, Agent, or Firm* — Hornkohl Intellectual Property Law PLLC; Jason L. Hornkohl

(57) ABSTRACT

A modular power supply that can be adapted to receive and charge practically any type or number of portable electronic devices includes a power converter that receives an AC wall voltage and converts the wall voltage to DC bus voltage. Each charging module has a pair of conductive rails and magnets positioned around the exterior of the module. The power converter has a connector that is physically and electrically coupled to a charging module through a pair of magnets and conductive rails such that the DC bus voltage is applied to the conductive rails of the module. Each charging module has a dock that physically couples to a portable electronic device and supplies a charging voltage produced from the DC bus voltage to the device. Additional charging modules can be physically and electrically coupled together by simply placing the modules adjacent one another through the interaction of the module's conductive rails and magnets. Adapters can be inserted into the docks of the charging modules to reconfigure the docks stations to mate with different types of devices. An FM transmitter can be included in one of the modules to transmit audio from the charging device to a remote FM receiver.

10 Claims, 4 Drawing Sheets

MODULAR POWER SUPPLY

CROSS-REFERENCES TO RELATED APPLICATIONS

None.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Portable electronic devices are increasingly common in modern society. Each of these portable devices has a rechargeable power supply that requires a corresponding power supply charger that conditions power received from a wall or car outlet to the voltage and current parameters required for the particular type of electronic device. As the number of devices increases, users have to maintain an increasing number of chargers to satisfy the requirements of their multiplying devices. Each home charger typically consists of a 100-240 volt plug attached to a transformer and an AC to DC voltage converter that produces the appropriate DC voltage for charging the particular type of electronic device and a device specific connector configured to couple to the device for which the charger is designed. The charger may also contain a physical mount or dock that supports or mounts the device while it is charging it. Since many of these types of chargers are similar in appearance, a user will often confuse the chargers and bring the wrong one or have to try various chargers before locating the appropriate one to charge a particular device. In addition, since a charger is typically designed for a particular device, a user will usually discard the charger when the device's useful life ends, even though the charger is perfectly capable of charging another device owned by the user.

The marketing and selling of power supplies also presents many obstacles. Consumers are typically ill informed about the details of chargers and don't want to have to locate a separate charger when purchasing a device. Thus, chargers are typically included with a device. When the device is no longer needed, the charger is discarded. However, due to the simplicity and overall durability of the basic components of power supplies, the power supply is typically still fully functional when the device is no longer usable and contains many of the same the basic components as the new charger that will be provided to the purchaser when they purchase a new device. Furthermore, since the manufacturers know that the chargers will be discarded before their components fail; there is little incentive to use high quality durable components in chargers.

In light of the problems discussed above, what is needed is an improved charger that can support and accept a large variety of different devices and accommodate new devices as they are developed.

BRIEF SUMMARY OF THE INVENTION

An embodiment of the present invention is directed toward a charger for charging at least two portable electronic devices. The charger includes a power converter having an external power supply connection for receiving an AC voltage from an external power supply. The power converter also includes an AC to DC converter for converting the AC voltage to a DC bus voltage and a module connector having at least one magnet and two output conductors. The charger includes a first charging module having a dock for receiving a portable electronic device and supplying a charging voltage to the portable electronic device. A pair of conductive rails and a plurality of magnets are positioned around a periphery of the first charging module. The charger further includes a second charging module that has a dock for receiving a portable electronic device and supplying a charging voltage to the portable electronic device. A pair of conductive rails and a plurality of magnets are positioned around a periphery of the second charging module. The power converter is physically and electrically coupled to the conductive rails and the peripheral magnets of the first charging module by the magnets and the conductors on the module connector such that the DC bus voltage is coupled to one of the conductive rails of the first charging module and a ground potential is electrically coupled to the other of the conductive rails of the first charging module. The first charging module is physically and electrically coupled to the second charging module by the peripheral magnets and conductive rails such that the DC bus voltage is coupled from one of the conductive rails of the first charging module to one of the conductive rails of the second charging module and the ground potential is electrically coupled from the other of the conductive rails of the first charging module to the other of the conductive rails of the second charging module when the first and second charging modules are positioned adjacent one another. The charger is not limited to two modules. The number of modules used is constrained by the specifications (voltage, amperage and wattage) of the power converter and the devices that are supported by the modules.

Another embodiment of the present invention is directed toward a charger for charging at least two portable electronic devices. The charger includes a power converter for receiving an AC voltage and converting the AC voltage to a bus voltage. The power converter includes an external power supply connection and at least one magnet for coupling the power converter to one of the charging modules. The charger also includes a first charging module having a dock for receiving a portable electronic device and supplying a charging voltage to the portable electronic device. The first charging module has an external conductor adapted to be electrically connected to the power converter such that the bus voltage is applied to the external conductor. The charger also includes a second charging module that has a dock for receiving a portable electronic device and supplying a charging voltage to the portable electronic device. The second charging module has an external conductor adapted to be electrically connected to the external conductor on the first charging module such that the DC bus voltage is received from the first charging module. Each dock is adapted to receive a portable electronic device such that a 30 pin electrical connector on the device is electrically coupled to a 30 pin electrical connector in the dock such that a DC voltage is applied to an electrical charging contact of the portable electronic device and such that a display of the device is visible and a user input of the device is accessible. Each of the charging modules further comprises a plurality of magnets positioned around a periphery of the charging module such that the magnets will physically and electrically couple the charging module to a second charging module placed adjacent the first charging module. A dock adapter is provided that is dimensioned to be inserted into one of the docks to configure the dock to receive a second size or type of portable electronic device having different dimensions than the portable electronic device for which the dock is configured. The adapter may include a voltage converter for converting a first DC voltage to a second DC voltage. One of said charging modules includes an FM transmitter for receiving an output audio signal from a device coupled to one of the docks and producing an FM broadcast signal based upon the output audio signal. The transmitting module has a display for displaying a transmit frequency of the FM transmitter and user inputs that allow a user to alter the transmit frequency.

Yet another embodiment of the present invention is directed toward a power supply for receiving electrical power from a wall outlet and providing conditioned power to at least one portable electronic device. The power supply includes a power converter that has a power plug and a cord adapted to be connected to a wall outlet and receive an AC voltage and an AC to DC converter for converting the AC voltage to a bus DC voltage. A first module is adapted to receive the DC bus voltage from the power converter. The first module includes a dock adapted to receive a portable device such that the module receives a DC voltage from the module and the portable device is physically held by the dock such that a display of the device is visible and a user input of the device is accessible. A second module is adapted to couple to the first module such that the second module receives the DC bus voltage from the first module. The second module includes a dock adapted to receive a portable device such that the portable device receives a DC voltage from the second module and is physically held by the dock such that a display of the device is visible and a user input of the device is accessible. The first and second modules are electrically coupled to each other through a pair of conductive rails positioned on an exterior of each of the modules. Each of the modules has a square external housing with a plurality of magnets positioned around a periphery of the external housing such that the magnets physically and electrically couple the modules when the modules are placed adjacent one another. The power converter has a connector for coupling the DC bus voltage to the conductive rails and a magnet for physically attaching the connector to the magnets of the modules. One of the modules has a rechargeable battery that is charged by the bus DC voltage such that the module can be used to charge a device when the module is decoupled from the power converter. One of the modules can also include a processor for monitoring charge parameters for the module and a display that produces a charge status output.

DETAILED DESCRIPTION OF THE INVENTION

Figure 1:
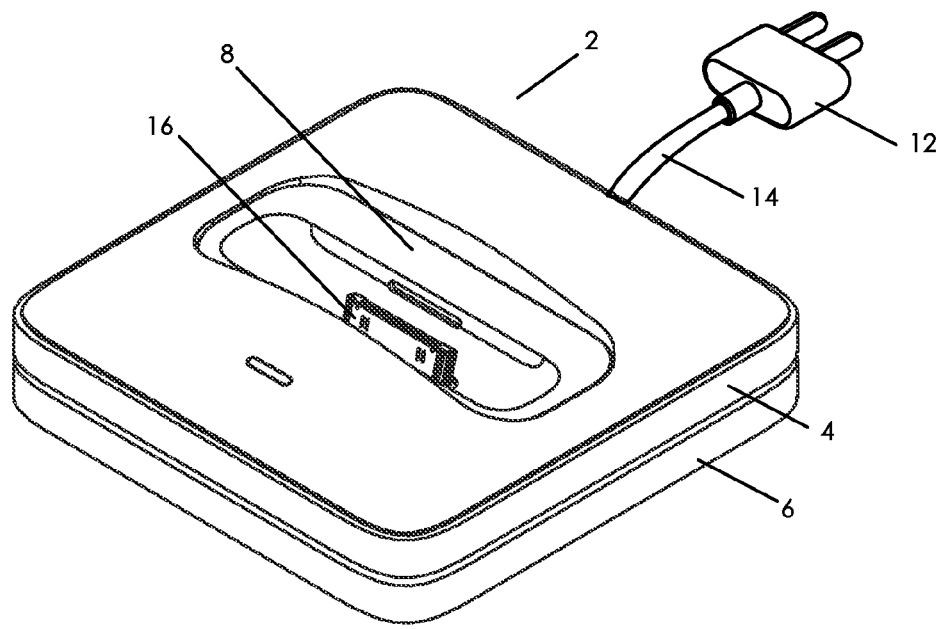
FIG. 1 is an illustration of a charging module constructed in accordance with an embodiment of the present invention having conductive rails.
Figure 1:
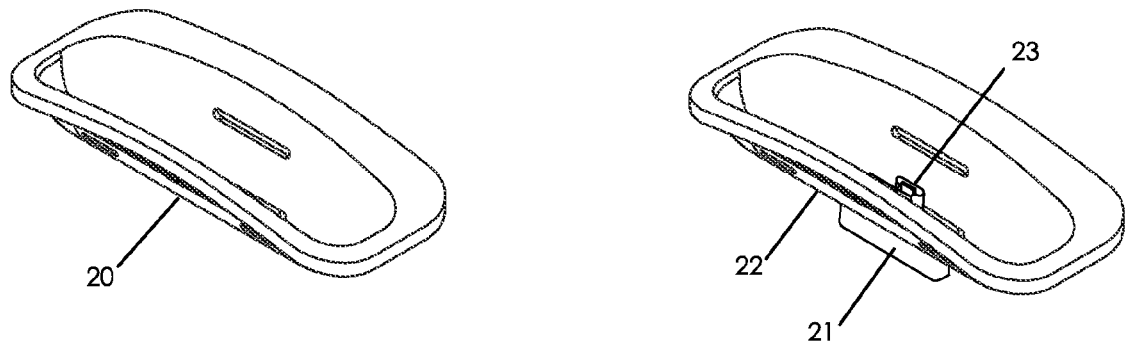
Figure 2:
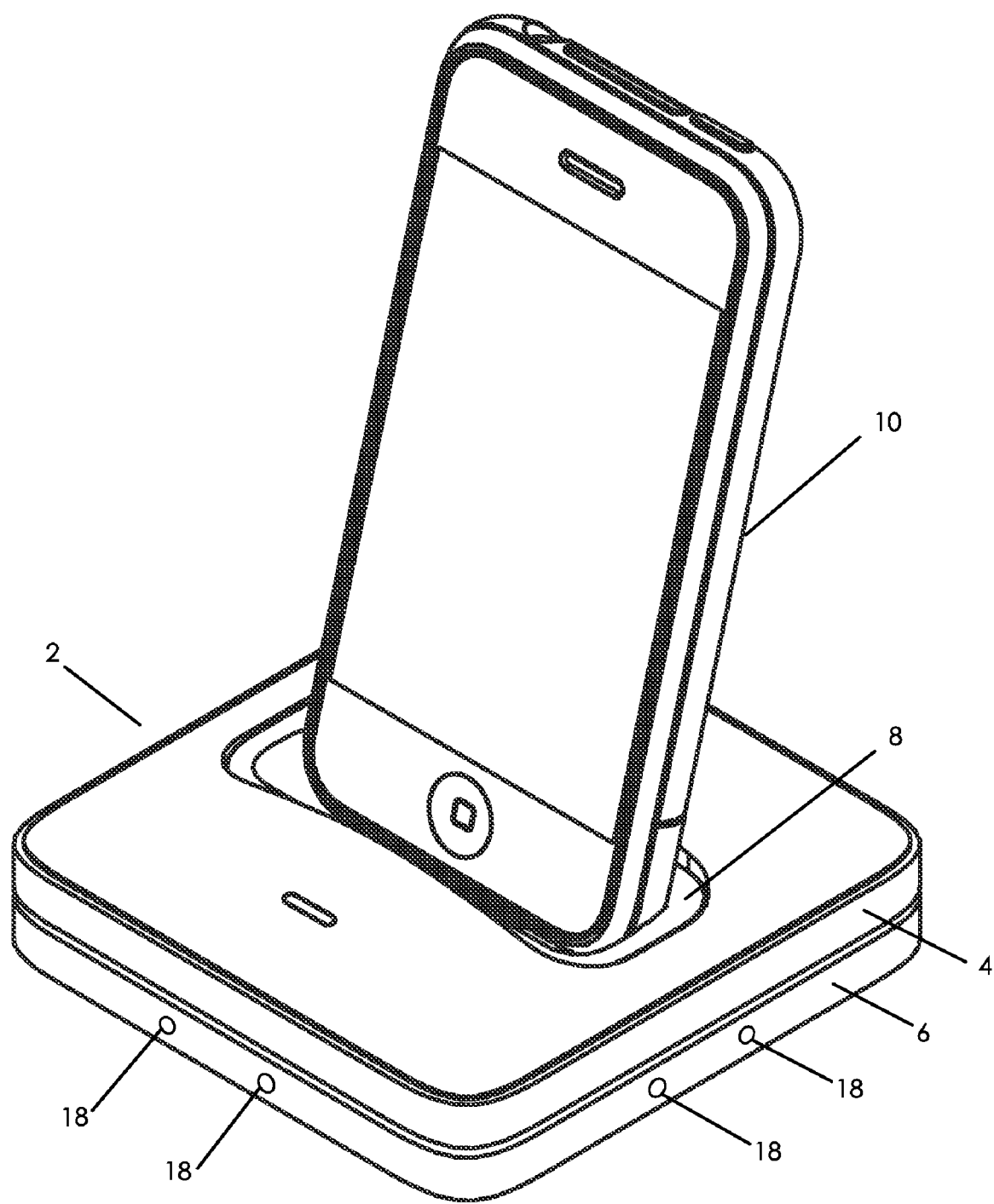
FIG. 2 is an illustration the charging module of FIG. 1 having a portable electronic device mounted thereon.

An illustration of a charging module 2 for a modular charger constructed in accordance with an embodiment of the present invention having electrified rails 4 and 6 is shown is FIG. 1. The charging module 2 is a square that has electrified rails 4 and 6 around its periphery. The rails 4 and 6 are adapted to receive and supply a DC bus voltage. The rails 4 and 6 are used to electrically connect adjacent modules. A DC bus voltage of 24 volts is preferably used so that a user can not seriously shock or harm them self by contacting the rails 4 and 6. A docking station 8 is provided on the module 2 that is adapted to receive an electronic device 10 as shown in FIG. 2. The docking station 8 has a connector 16 that is adapted to physically and electrically connect the portable electronic device 10 to the to the main body portion 2.

The main body portion of the charging module 2 receives power from an external power supply connector 12 such as household plug 12 and cable 14. An AC to DC converter 19 is contained within an enclosure attached to the cable. Alternatively, the external power supply connector 12 can be a 12-volt car cigarette outlet adapter that directly receives a DC voltage such that no AC to DC converter is required. The AC to DC converter 19 contains voltage conditioning circuitry that receives electrical power through the external power supply connector 12 and converts the electrical power into the desired voltage and current for the rails 4 and 6. In the embodiment shown, the docking station contains a 30 pin connector 16 adapted to couple to a digital media player such as an Apple iPod. However, the connector 16 can be any type of connector such as a USB port.

Adapters 20 and 22 can be snapped into the docking station 8 to configure the docking station to receive a different type of portable electronic device. The adapters 20 and 22 allow a user to customize the accessory to accept the particular type of devices that they need to charge. These adapters can be used to alter the physical dimensions of the dock to accommodate a different size device or provide alternative voltages for a different type of device by altering the voltage output that is electrically connected to the charging contact of the adapter output 23. The adapter 20 has a 30 pin connector 21 that couples with the connector 16 in the docking station 8. The adapter dock connector 21 is electrically connected to an adapter output connector 23, such as a male micro USB connector, that is configured to couple to a different type of portable electronic device than the docking station connector 16. The housing 25 of the adapter 22 is configured to alter the inner dimensions of the docking station 8 to support an alternative type of device for which the adapter 22 is designed.

The charging module shown in FIG. 1 has magnets 18 positioned around its periphery that can be used to join the charging module to power modules as discussed in more detail below with respect to FIG. 2. The magnets 18 are positioned such that adjacent magnets have opposite polarity.

Figure 3:
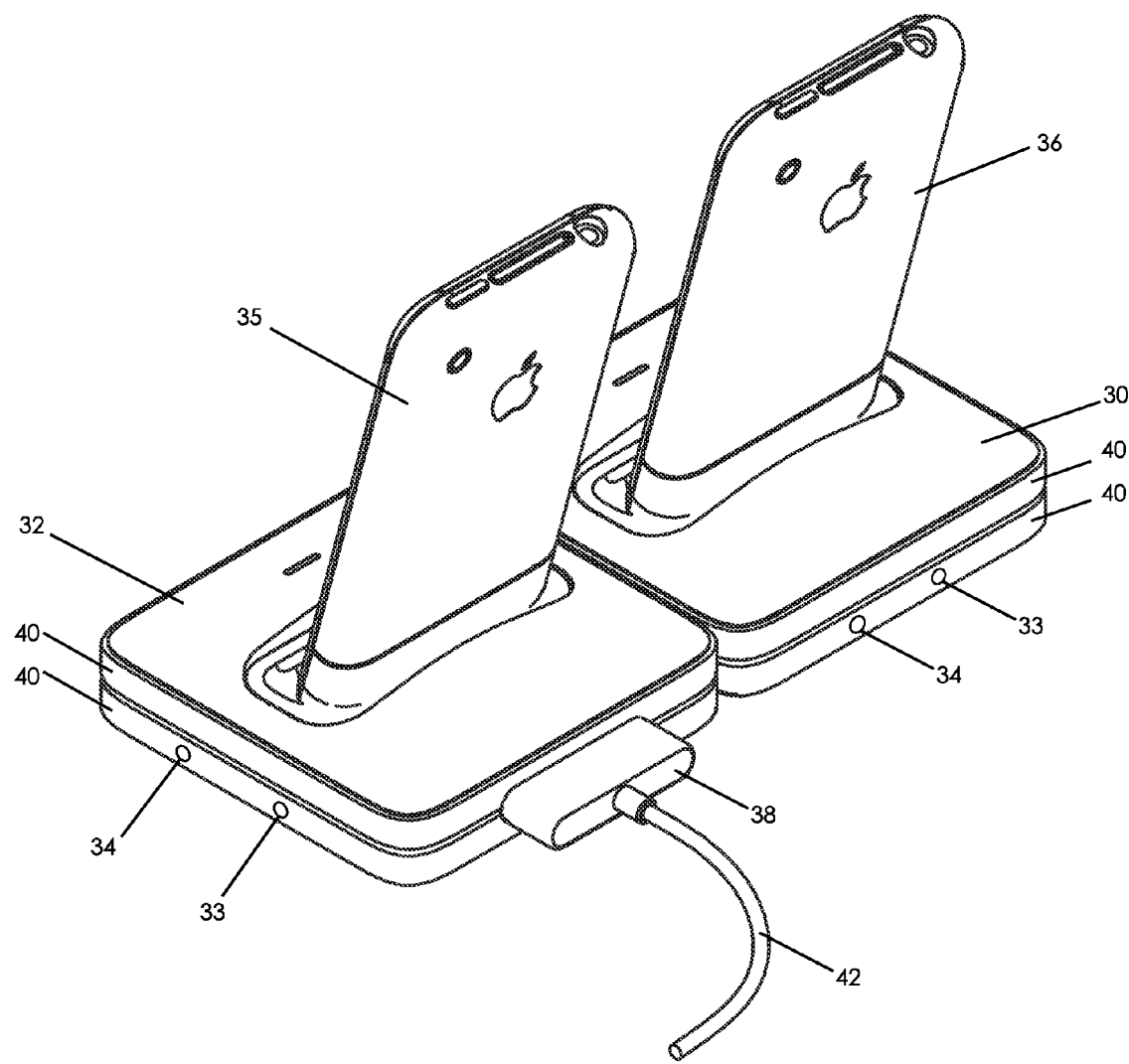
FIG. 3 is an illustration of two charging modules coupled together in accordance with an embodiment of the present invention.

Referring now to FIG. 3, an illustration of two charging modules 30 and 32 electrically and physically coupled together is shown. The modules 30 and 32 are physically coupled together with magnetic connectors 34. The charging modules 30 and 32 are each adapted to mount and charge a particular type of portable electronic device 35 and 36. The charging module 30 is connected to a connector 38 having mating magnets positioned thereon that physically hold the connector 38 to the magnets 34 and electrified rails 40 of the module 30. The connector 38 is connected to an AC to DC converter through a cable 42 as discussed with respect to FIG. 1. The connector 38 is used to supply the DC bus voltage to the rails of the module 32. The modules 30 and 32 have voltage conversion circuitry that converts the DC bus voltage into the voltage required by the particular device 35 or 36 for which the module is designed.

Magnets 33 and 34 are positioned around the periphery of the charging module 30 and modules 32, 24 and 36 so the modules and charging module are drawn together when placed in close proximity. The polarity of the magnets 33 and 34 is arranged so that the charging modules 30 and 32 come together with a preferred alignment. Thus, by simply positioning the module 32 next to the module 30, the modules are physically and electrically coupled through the electrified rails 40 and magnets 33 and 34. Additional modules can be coupled to the charging modules 30 and 32 simply by placing the additional adjacent either the modules 30 and 32. Thus, using the power modules of FIG. 3, a user can quickly and easily set up a custom charging station. In addition, products can be sold with a module adapted for that particular product that can simply be connected to the users existing charging modules. The number of modules that can be connected depends upon the ability of the cable 38 to supply power, the number of power cables 38 used and the power requirements of the devices being charged. While magnets and electrified rails are the preferred method of coupling adjacent modules, alternative means such as DC jacks, USB connectors, etc., can be used to couple the modules in alternative embodiments.

Figure 4:
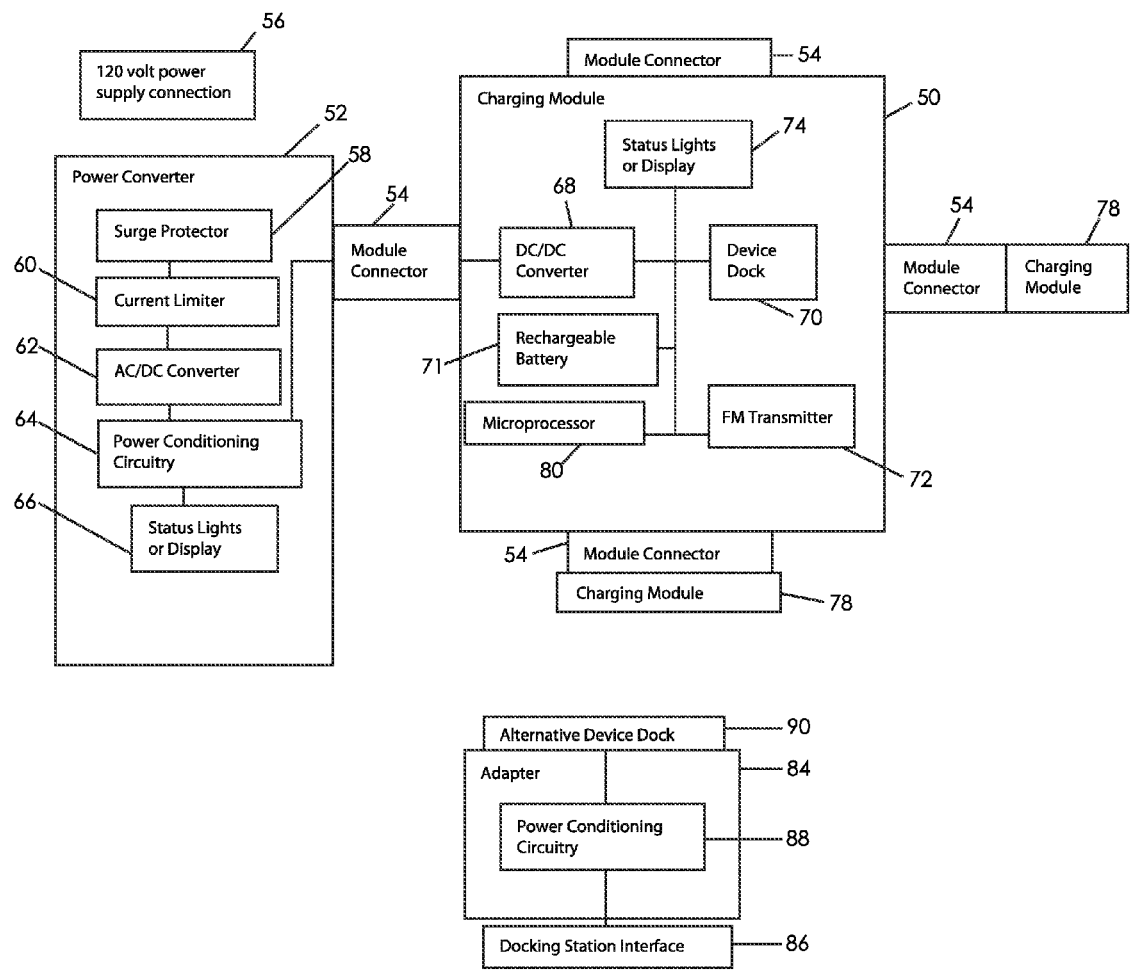
FIG. 4 is a block diagram of an embodiment of the present invention.

Referring now to FIG. 4, a block diagram of an embodiment of the present invention is shown. The charging module 50 is electrically coupled to a power converter 52 through a module connector 54. The power converter 52 has a 120 volt AC power supply connection 56 such as a standard plug and cord. A surge protector 58 coupled to the power supply connection 56 prevents power surges from the power supply connection 56 from damaging the converter's 52 internal circuitry. A current limiter 60 limits the current supplied to a predetermined maximum current level to prevent damaging the devices being charged or creating hazardous shorting conditions. An AC to DC converter 62 receives the 120 V AC power from the current limiter 60 and converts the voltage into the desired DC bus voltage. Power conditioning circuitry 64 can be included to further condition the DC voltage. A DC bus voltage of 24 volts is preferred since this is the maximum DC voltage commonly used and it can be easily stepped down to a lower DC voltage for any device that requires it with a simple passive circuit. The output voltage of the power converter 52 is electrically coupled to the charging module 50 through a module connector 54 such as the electrified rails and magnets discussed above. A set of status lights or display 66 can be used to indicate the condition of the power converter 58.

The charging module 50 has a DC/DC converter 68 that converts the DC bus voltage into the voltage required by the device for which its device dock 70 is designed. The device dock 70 has a housing configured to hold or cradle the portable device and an electrical connector that couples to a connector on the device as described above with respect to FIG. 1. The charging module 50 includes multiple module connectors 54 that are adapted to mate with module connectors on additional charging modules 78. To set up charger for simultaneously charging three devices, a user simply purchases the desired power supply modules and couples each of the modules through their module connectors. If the user acquires a new portable device that needs charging, the user can simply purchase the appropriate power supply module 50. This allows the modules to be positioned in a wide variety of configurations around the power supply base. The number of modules that can be coupled together is only limited by the power converter's 52 ability to provide sufficient power to charge the devices docked to the charging modules.

An FM transmitter 72 can be included in the charging module 50 such that an audio signal can be received from a portable electronic device mounted in the dock 70 and broadcast by the FM transmitter 72 to a remote receiver such as a home stereo. This allows a user to listen to their digital music player while it is charging over the home stereo receiver. A display and user inputs 74 are provided on such an embodiment in a manner that allows a user can select the desired frequency for the transmitter.

A rechargeable battery 71 may be provided in the module 50 such that the module can continue to charge a device when the module 50 is not connected to the power converter 52 until the rechargeable battery is exhausted.

An adapter 84 is provided that has a dock interface 86 that is adapted to electrically and physically couple to the dock 70. The adapter 48 contains power conditioning circuitry 88 that alters the output voltage of the dock 70 to which it is coupled to a second output DC voltage level required by a portable device for which the adapter 84 is designed. The power conditioning circuitry 88 provides the proper output voltage and current to an alternative device dock 90 that is adapted to couple to the device for which the adapter 84 is designed. The adapter 84 connects to a dock 70 to configure the dock to accept an alternative type of electronic device. Thus, a proper set of adapters allow a user to configure the charging module 50 to accept the particular types of devices that they own. The adapters 84 can preferably be purchased separately such that a consumer can only purchase the particular adapters that they require.

A microprocessor 80 can be used in connection with user inputs and a display 74 to provide the user feedback with regard to the charging condition of the devices and charger. For example, an overload indicator light can be provided to indicate when the microprocessor 80 detects that a current supply limit is being exceeded. A red LED can be used in connection with each module to indicate that the module is charging and a green LED to indicate the device mounted on the module 50 is fully charged.

Although there have been described particular embodiments of the present invention of a new and useful MODULAR POWER SUPPLY, it is not intended that such references be construed as limitations upon the scope of this invention except as set forth in the following claims.

What is claimed is:

1. A charger for charging at least two portable electronic devices, said charger comprising: a power converter for receiving an AC voltage and converting the AC voltage to a DC bus voltage; a first charging module comprising: a first dock for receiving a first portable electronic device and supplying a charging voltage to the portable electronic device; a first external conductor adapted to be electrically connected to said power converter such that said bus voltage is applied to said first external conductor, a second charging module comprising: a second dock for receiving a second portable electronic device and supplying a second charging voltage to the portable electronic device; a second external conductor adapted to be electrically connected to said external conductor on said first charging module such that said DC bus voltage is received from said first charging module; and wherein said first charging module is physically and electrically coupled to said second charging module by said peripheral magnets and conductive rails.

2. The charger of claim 1 wherein each dock is adapted to receive a portable electronic device such that a 30 pin electrical connector on said device is electrically coupled to a 30 pin electrical connector in said dock such that a DC voltage is applied to an electrical charging contact of said portable electronic device and such that a display of said device is visible and a user input of said device is accessible.

3. The charger of claim 1 wherein each of said charging modules further comprises a plurality of magnets positioned around a periphery of said charging module such that said magnets will physically and electrically couple said charging module to a second charging module placed adjacent said charging module.

4. The charger of claim 1 further comprising a dock adapter dimensioned to be inserted into one of said docks to configure said dock to receive a second type of portable electronic device having different dimensions than said portable electronic device for which said dock is configured.

5. The charger of claim 4 wherein said adapter includes a voltage converter for converting a first DC voltage to a second DC voltage.

6. The charger of claim 4 further comprising an FM transmitter for receiving an output signal from a device coupled to one of said docks and producing an FM broadcast signal based upon said output signal.

7. The charger of claim 6 further comprising a display for displaying a transmit frequency and user inputs that allow a user to alter said transmit frequency.

8. The charger of claim 1 wherein said external conductor of said charging modules further comprises a pair of conductive rails positioned around a periphery of said charging modules.

9. The charger of claim 1 wherein said power converter further comprises an external power supply connection and at least one magnet for coupling said power converter one of said charging modules.

10. A charger for charging at least two portable electronic devices, said charger comprising: a power converter comprising: an external power supply connection for receiving an AC voltage from an external power supply; an AC to DC converter for converting the AC voltage to a DC bus voltage; and a module connector having at least one magnet and two output conductors; a first charging module comprising: a first dock for receiving a first portable electronic device and supplying a charging voltage to the portable electronic device; a first pair of conductive rails positioned around a periphery of said first charging module; and a first plurality of magnets positioned around a periphery of said first charging module; a second charging module comprising: a second dock for receiving a second portable electronic device and supplying a second charging voltage to the portable electronic device; a second pair of conductive rails positioned around a second periphery of said second charging module; and a second plurality of magnets positioned around the periphery of said second charging module; wherein said power converter is physically and electrically coupled to said conductive rails and said peripheral magnets of said first charging module by said magnets and said conductors on said module connector such that said DC bus voltage is coupled to one of said conductive rails of said first charging module and a ground potential is electrically coupled to the other of said conductive rails of said first charging module; and wherein said first charging module is physically and electrically coupled to said second charging module by said peripheral magnets and conductive rails such that said DC bus voltage is coupled from one of said conductive rails of said first charging module to one of said conductive rails of said second charging module and said ground potential is electrically coupled from the other of said conductive rails of said first charging module to the other of said conductive rails of said second charging module when said first and second charging modules are positioned adjacent one another.

* * * * *